United States Patent
Kwon et al.

(10) Patent No.: US 10,805,893 B2
(45) Date of Patent: Oct. 13, 2020

(54) SYSTEM AND METHOD FOR PROVIDING UNIVERSAL SYNCHRONIZATION SIGNALS FOR NEW RADIO

(71) Applicant: Samsung Electronics Co., Ltd., Gyeonggi-do (KR)

(72) Inventors: Hyukjoon Kwon, San Diego, CA (US); Niranjan Nayak Ratnakar, San Diego, CA (US); Kee-Bong Song, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 2 days.

(21) Appl. No.: 15/353,274

(22) Filed: Nov. 16, 2016

(65) Prior Publication Data
US 2018/0054788 A1 Feb. 22, 2018

Related U.S. Application Data (60) Provisional application No. 62/377,372, filed on Aug. 19, 2016.

(51) Int. Cl.
*H04W 56/00* (2009.01)
*H04L 27/26* (2006.01)
(Continued)

(52) U.S. Cl.
CPC ....... *H04W 56/002* (2013.01); *H04J 11/0073* (2013.01); *H04J 11/0076* (2013.01);
(Continued)

(58) Field of Classification Search
None
See application file for complete search history.

(56) References Cited

U.S. PATENT DOCUMENTS 7,747,724 B2    6/2010 Wallis et al.
8,189,557 B2 *  5/2012 Onggosanusi ....... H04J 11/0069
                                                    370/310
(Continued)

FOREIGN PATENT DOCUMENTS

WO    WO 2013189458    12/2013
WO    WO 2016105570     6/2016

OTHER PUBLICATIONS

Kim, Hee Wook et al., A Satellite Radio Interface for IMT-Advanced System Using OFDM, Nov. 2010, Copyright 2010 IEEE, pp. 303-308.
(Continued)

*Primary Examiner* — Ayaz R Sheikh
*Assistant Examiner* — Faiyazkhan Ghafoerkhan
(74) *Attorney, Agent, or Firm* — The Farrell Law Firm, P.C.

(57) ABSTRACT

A method and apparatus are provided. The method includes, but is not limited to, receiving a universal synchronization signal (USS) including a universal primary synchronization signal (UPSS) and a universal secondary synchronization signal (USSS), wherein the USS is coded using a mother code which is extended to m resource blocks (RBs) and n orthogonal frequency division multiplexing (OFDM) symbols and a code cover of m RBs and n symbols is applied to the mother code, determining a cell identity based on the USS, determining a frame timing based on the USS, and connecting a user equipment to a network using the cell identity and the frame timing.

18 Claims, 10 Drawing Sheets

(51) Int. Cl.
*H04L 5/00* (2006.01)
*H04J 11/00* (2006.01)
*H04L 23/02* (2006.01)
*H04W 4/70* (2018.01)
*H04J 13/00* (2011.01)

(52) U.S. Cl.
CPC ............ *H04L 5/005* (2013.01); *H04L 27/261* (2013.01); *H04L 27/2656* (2013.01); *H04L 27/2675* (2013.01); *H04J 13/0062* (2013.01); *H04L 5/0044* (2013.01); *H04L 5/0051* (2013.01); *H04L 5/0053* (2013.01); *H04L 23/02* (2013.01); *H04L 27/2601* (2013.01); *H04W 4/70* (2018.02)

(56) References Cited

U.S. PATENT DOCUMENTS

| | | | |
|---|---|---|---|
| 8,868,110 B2 | 10/2014 | Kumar Reddy et al. | |
| 8,873,437 B2 | 10/2014 | Kishiyama et al. | |
| 8,972,829 B2 | 3/2015 | Wang et al. | |
| 9,025,586 B2* | 5/2015 | Onggosanusi | H04L 5/0007 370/350 |
| 9,148,208 B2 | 9/2015 | Zhu et al. | |
| 9,166,718 B2 | 10/2015 | Chen et al. | |
| 9,276,693 B2 | 3/2016 | Kim et al. | |
| 10,123,293 B2* | 11/2018 | Zhang | H04J 11/0069 |
| 2005/0055382 A1 | 3/2005 | Ferrat et al. | |
| 2008/0240005 A1 | 10/2008 | Hoffman et al. | |
| 2009/0201869 A1* | 8/2009 | Xu | H04L 5/0092 370/329 |
| 2014/0119312 A1* | 5/2014 | Doetsch | H04B 7/0404 370/329 |
| 2014/0185495 A1* | 7/2014 | Kuchibhotla | H04L 5/0094 370/281 |
| 2014/0293821 A1 | 10/2014 | Breuer | |
| 2015/0085684 A1 | 3/2015 | Sadek | |
| 2015/0188677 A1 | 7/2015 | Dinan | |
| 2016/0095117 A1 | 3/2016 | Doppler et al. | |
| 2016/0097835 A1 | 4/2016 | Zhang et al. | |
| 2016/0219584 A1 | 7/2016 | Bertrand et al. | |
| 2016/0227462 A1* | 8/2016 | Axmon | H04W 36/32 |
| 2016/0227498 A1* | 8/2016 | Zhang | H04J 11/0069 |
| 2016/0227513 A1* | 8/2016 | Vajapeyam | H04W 72/0446 |
| 2016/0227582 A1* | 8/2016 | Vajapeyam | H04W 74/0833 |
| 2017/0171865 A1* | 6/2017 | Hwang | H04B 1/713 |
| 2017/0187563 A1* | 6/2017 | Shin | H04L 27/2675 |
| 2017/0207884 A1* | 7/2017 | Jiang | H04L 1/0061 |
| 2017/0223648 A1* | 8/2017 | Shin | H04W 56/005 |
| 2017/0238284 A1* | 8/2017 | Tseng | H04W 72/0453 370/329 |
| 2017/0311276 A1* | 10/2017 | Tsai | H04B 7/0617 |
| 2017/0332359 A1* | 11/2017 | Tsai | H04B 7/0617 |
| 2017/0359791 A1* | 12/2017 | Onggosanusi | H04L 5/0023 |
| 2018/0184413 A1* | 6/2018 | Rong | H04W 48/18 |
| 2018/0270008 A1* | 9/2018 | Yi | H04W 74/0833 |
| 2019/0036756 A1* | 1/2019 | Yi | H04W 4/80 |
| 2019/0075533 A1* | 3/2019 | Zhang | H04J 11/0069 |

OTHER PUBLICATIONS

Lahetkangas, Eeva et al., Achieving low latency and energy consumption by 5G TDD mode optimization, IEEE Jun. 10, 2016, pp. 6.

Bogucka, Hanna et al., Dynamic Spectrum Aggregation for Future 5G Communications, IEEE Communications Magazine May 2015, Copyright 2015 IEEE, pp. 10.

El Ayoubi, Salah Eddine et al., 5G RAN Architecture and Functional Design, 5G PPP METIS-II, Mar. 8, 2016, pp. 27.

Saily, Mikko et al., Deliverable D6.1 Draft Asynchronous Control Functions and Overall Control Plane Design, 5G PPP METIS-II, Jun. 30, 2016, pp. 120.

Schaich, Frank et al., Flexible Air iNTerfAce for Scalable service delivery wiThin wireless Communication networks of the 5th Generation (FANTASTIC-5G) . . . 5G PPP, May 30, 2016, pp. 214.

* cited by examiner

SYSTEM AND METHOD FOR PROVIDING UNIVERSAL SYNCHRONIZATION SIGNALS FOR NEW RADIO

PRIORITY

This application claims priority under 35 U.S.C. § 119(e) to U.S. Provisional Patent Application No. 62/377,372, which was filed in the U.S. Patent and Trademark Office on Aug. 19, 2016, the entire content of which is incorporated herein by reference.

FIELD

The present disclosure generally relates to a method and apparatus, and more particularly, to a method and apparatus for providing universal synchronization signals for new radio (NR) access technology.

BACKGROUND

Users of electronic devices require increasing functionality and performance in applications, services and the communication networks used by electronic devices. Fifth generation (5G) wireless communication networks, also referred to as new radio (NR) access technology, provides increased performance and capacity for data and voice communications for users and supports multiple new communication services such as enhanced mobile broad band (eMBB), massive machine type communication (mMTC), ultra reliable low latency communication (URLLC), and narrow-band Internet of things (NB-IoT). The 3rd generation partnership project (3GPP) radio layer 1 (RAN1) group supports the specification of standards that enables these new communication services. Each of the services is targeted towards achieving different goals depending on the application. For example, eMBB targets high data throughput and capacity to provide smartphone and tablet users with services such as high definition video delivery, mMTC targets maximizing the number of connections for a very large number of small and power-constrained devices, where each device infrequently transmits a low volume of latency insensitive data, and NB-IoT is targeted towards low power devices for applications such as smart cities, connected industrial devices and mobile health. To support multiple communication services with a single standardized specification, re-designing of synchronization signals is required. 3GPP has determined the basic principle for the design of NR synchronization signals to be flexibly configurable resource allocations and sharing of synchronization signals among multiple numerologies.

SUMMARY

An aspect of the present disclosure provides a method which includes receiving a universal synchronization signal (USS) including a universal primary synchronization signal (UPSS) and a universal secondary synchronization signal (USSS), wherein the USS is coded using a mother code which is extended to m resource blocks (RBs) and n orthogonal frequency division multiplexing (OFDM) symbols and a code cover of m RBs and n symbols is applied to the mother code, determining a cell identity number based on the USS, determining a frame timing based on the USS, and connecting a user equipment to a network using the cell identity number and the frame timing.

Another aspect of the present disclosure provides an apparatus which includes a receiver configured to receive a universal synchronization signal (USS) including a universal primary synchronization signal (UPSS) and a universal secondary synchronization signal (USSS), wherein the USS is coded using a mother code which is extended to m resource blocks (RBs) and n orthogonal frequency division multiplexing (OFDM) symbols and a code cover of m RBs and n symbols is applied to the mother code, and a processor configured to determine a cell identity from the USS, determine a frame timing from the USS, and connect a user equipment to a network using the cell identity and the frame timing.

Another aspect of the present disclosure provides a method of manufacturing a processor which includes forming the processor as part of a wafer or package that includes at least one other processor, wherein the processor is configured to receive a universal synchronization signal (USS) comprising a universal primary synchronization signal (UPSS) and a universal secondary synchronization signal (USSS), wherein the USS is coded using a mother code which is extended to m resource blocks (RBs) and n orthogonal frequency division multiplexing (OFDM) symbols and a code cover of m RBs and n symbols is applied to the mother code, determine a cell identity from the USS, determine a frame timing from the USS, and connect a user equipment to a network using the cell identity and the frame timing.

Another aspect of the present disclosure provides a method of constructing an integrated circuit, which includes generating a mask layout for a set of features for a layer of the integrated circuit, wherein the mask layout includes standard cell library macros for one or more circuit features that include a processor configured to receive a universal synchronization signal (USS) comprising a universal primary synchronization signal (UPSS) and a universal secondary synchronization signal (USSS), wherein the USS is coded using a mother code which is extended to m resource blocks (RBs) and n orthogonal frequency division multiplexing (OFDM) symbols and a code cover of m RBs and n symbols is applied to the mother code, determine a cell identity from the USS, determine a frame timing from the USS, and connect a user equipment to a network using the cell identity and the frame timing.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
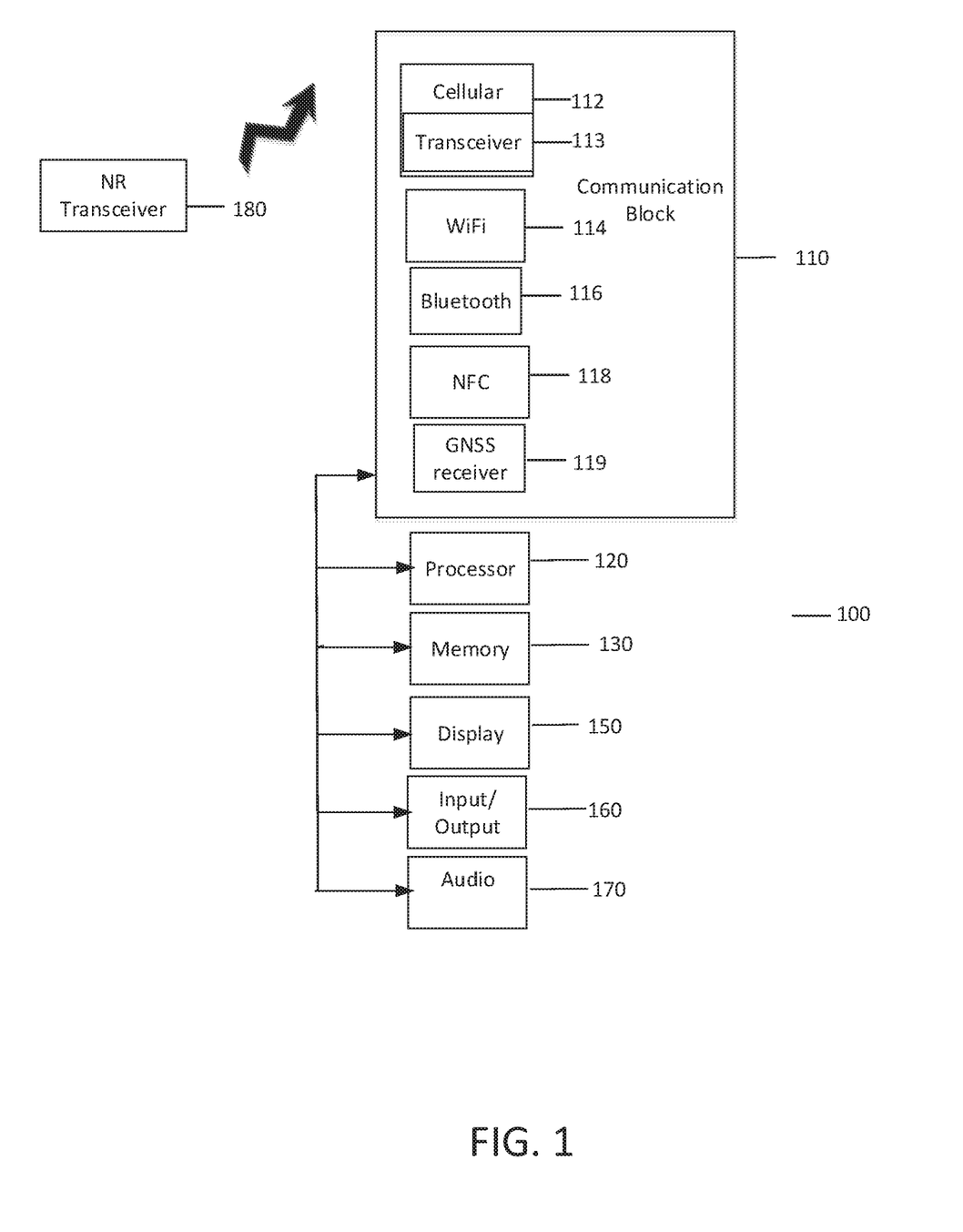
FIG. 1 is a block diagram of an electronic device in a communication network, according to an embodiment of the present disclosure.

FIG. 1 is a block diagram of an electronic device in a network environment, according to an embodiment of the present disclosure.

Referring to FIG. 1, an electronic device 100 includes, but is not limited to, a communication block 110, a processor 120, a memory 130, a display 150, an input/output block 160, an audio block 170 and a new radio (NR) transceiver 180. The NR transceiver 180 may be included in a cellular base station and includes, but is not limited to, a wireless transmitter and receiver.

The electronic device 100 includes a communication block 110 for connecting the device 100 to another electronic device or a network for communication of voice and data. The communication block 110 provides NR, cellular, wide area, local area, personal area, near field, device to device (D2D), machine to machine (M2M), satellite, enhanced mobile broad band (eMBB), massive machine type communication (mMTC), ultra reliable low latency communication (URLLC), narrow-band Internet of things (NB-IoT) and short range communications. The functions of the communication block 110, or a portion thereof including a transceiver 113, may be implemented by a chipset. In particular, the cellular communications block 112 provides a wide area network connection through terrestrial base transceiver stations or directly to other electronic devices, using technologies such NR access technology, D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes a GNSS receiver 119. The GNSS receiver 119 may support receiving signals from a satellite transmitter.

The electronic device 100 may receive electrical power for operating the functional blocks from a power supply, including, but not limited to a battery. The NR transceiver 180 may be a part of a terrestrial base transceiver station (BTS) (such as a cellular base station) and include a radio frequency transmitter and receiver conforming to 3GPP standards. The NR transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112. The cellular communications block 112 may also have a local processor or a chipset which dedicates computing resources to cellular communications block 112 and other functional blocks such as universal synchronization signals required for cellular communication.

The memory 130 provides storage for device control program code, user data storage, application code and data storage. The memory 130 may provide data storage for the firmware, libraries, databases, lookup tables, algorithms, methods, universal synchronization signal parameters, and calibration data required by the cellular communications block 112. The program code and databases required by the cellular communications block 112 may be loaded into local storage within the cellular communications block 112 from the memory 130 upon device boot up. The cellular communications block 112 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The NR transceiver 180 may be included in a base station that is used to receive, transmit or relay wireless signals. The NR transceiver 180 may facilitate communication with the electronic device 100 by sending, receiving, and relaying communication and universal synchronization signals to and from the electronic device 100. The electronic device 100 may be connected to a network through the NR transceiver 180.

For example, the NR transceiver 180 may be a cell tower, a wireless router, an antenna, multiple antennas, or a combination thereof being used to send signals to, or receive signals from, the electronic device 100, such as a smartphone. The NR transceiver 180 may relay the wireless signals through the network to enable communication with other electronic devices 100 such as user equipment (UE), servers or a combination thereof. The NR transceiver 180 may be used to transmit the communication signals, such as voice or data. The electronic device 100 may receive and process signals including universal synchronization signals from the NR transceiver 180.

Based on the communication method, such as NR access technology, eMBB, mMTC, URLLC, NB-IoT, code division multiple access (CDMA), orthogonal frequency division multiple access (OFDMA), third generation partnership project (3GPP) long term evolution (LTE), long term evolution advanced (LTE-A), fourth generation cellular wireless standards (4G), new radio, or fifth generation cellular wireless standards (5G), the communication signals may also have universal synchronization signals within the communicated information. The universal synchronization signals may be embedded within the communicated information at a regular time interval.

According to an embodiment of the present disclosure, the present system and method provides a synchronization signal structure for transmission of universal synchronization signals (USS) from the NR transceiver 180 to the transceiver 113 of the electronic device 100. The USS of the present disclosure may be used simultaneously for multiple communication services including, but not limited to, eMBB, mMTC, URLLC and NB-IoT. The USS may be flexibly configured over a number of resource blocks (RBs) and a number of symbols transmitted from the NR transceiver 180 to the transceiver 113 of electronic device 100. The USS may also provide synchronization signals for other communication services.

According to an embodiment of the present disclosure, the USS includes a universal primary synchronization signal (UPSS) and a universal secondary synchronization signal (USSS). The USS may have a mother code spanned over 1 RB and 1 symbol. The mother code may also be extended to m RBs over frequency and n symbols over time. The mother code is the original code before puncturing. The 2-dimensional extended signals, where one dimension is frequency and the other dimension is time, may be a synchronization signal for eMBB that is transmitted across multiple RBs. In addition, 1 RB within m RBs may be assigned to NB-IoT. In long term evolution (LTE), the dedicated RB for NB-IoT synchronization signals may not be located at the central 6 RBs, since the central 6 RBs are occupied for use in LTE. The present system and method shares the resources of m RBs assigned to universal synchronization signals such that 1 RB among m RBs may be used for NB-IoT.

According to an embodiment of the present disclosure, the values of m and n may be flexibly configured. For example, in LTE, the down-link (DL) synchronization signal uses 1 symbol in time and 62 subcarriers in frequency. In LTE, the sidelink (SL) synchronization signal is repeated in time such that 2 symbols are used for synchronization resources. NB-IoT only considers 1 RB and 11 symbols for the synchronization resources. In order to support multiple communication services with a single universal structure, both m and n may be flexibly configured.

Since the USS includes multiple short sequences over frequency, it may be extended to non-contiguous RBs. Synchronization in LTE and sidelink synchronization such as in D2D only considers the central 6 RBs, and NB-IoT only needs to check pre-determined RB indices that may be located at non-central 6 RBs. The present system and method extends the mother code (1 RB, 1 symbol) to non-contiguous RBs in order to universally support multiple communication services.

According to an embodiment of the present disclosure, the USS (including the UPSS and the USSS) includes sharing of mother codes over frequency among multiple services, extension of mother codes to time/frequency with two dimensional code covers, and is applicable to non-contiguous RBs and orthogonal frequency-division multiplexing (OFDM) symbols with mother codes.

LTE has two downlink synchronization signals that a UE uses to obtain the cell identity and frame timing of a cell the UE is attempting to connect to. The two downlink synchronization signals include the primary synchronization signal (PSS) and the secondary synchronization signal (SSS). There are a total of 504 unique physical cell identities. The identity number of a cell may be determined by Equation (1) as follows:

$$N_{ID}^{CELL}=3N_{ID}^{(1)}+N_{ID}^{(2)} \qquad (1)$$

where $N_{ID}^{(1)}$ is the physical cell identity group (0 to 167), which is detected by the SSS and $N_{ID}^{(2)}$ is the cell identity within the cell identity group (0 to 2) which is detected by the PSS. The PSS may be based on a frequency domain Zadoff-Chu (ZC) sequence and may have a length of 62 symbols. The PSS may be determined by Equation (2) as follows:

$$d_u(n) = e^{\frac{-j\pi un(n+1)}{63}} \text{ for } n = 0, 1, \ldots, 30$$
$$d_u(n) = e^{\frac{-j\pi u(n+1)(n+2)}{63}} \text{ for } n = 31, 32, \ldots, 61 \qquad (2)$$

Figure 2:
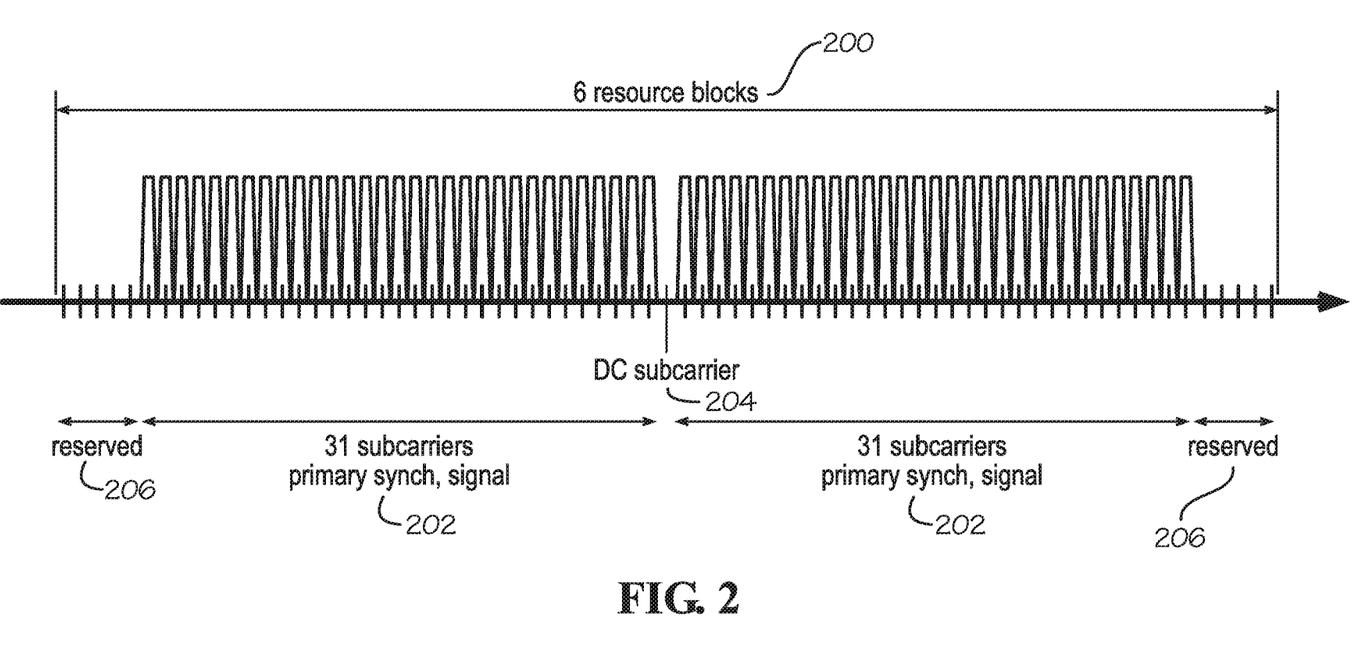
FIG. 2 illustrates a mapping of a primary synchronization signal to subcarriers of resource blocks of an orthogonal frequency division multiplexing (OFDM) communication system, according to an embodiment of the present disclosure.

FIG. 2 illustrates a mapping of a primary synchronization signal to subcarriers of resource blocks of an orthogonal frequency division multiplexing (OFDM) communication system, according to an embodiment of the present disclosure.

Referring to FIG. 2, the PSS is mapped to the central six resource blocks 200 over 72 subcarriers. In the frequency domain, the PSS and SSS occupy the central six resource blocks 200, irrespective of the system channel bandwidth, which allows the UE to synchronize to the network without prior knowledge of the allocated bandwidth. The synchronization sequences use 62 sub-carriers in total, with 31 sub-carriers 202 mapped on each side of the DC sub-carrier 204 which is not used and leaves 5 sub-carriers reserved 206 at each end of the 6 central RBs 200.

Figure 3A:
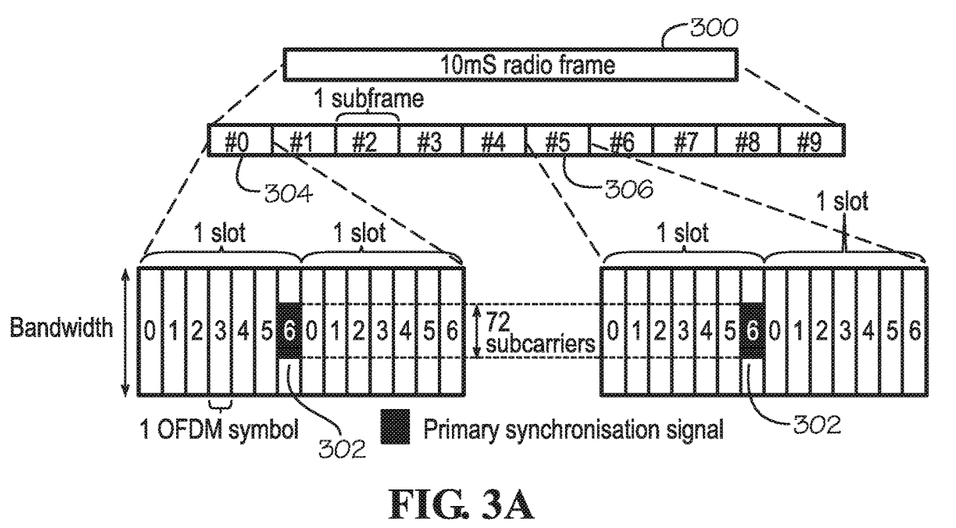
FIG. 3A illustrates a mapping of a primary synchronization signal in a frequency division duplexing wireless communication system, according to an embodiment of the present disclosure.

FIG. 3A illustrates a mapping of a primary synchronization signal in a frequency division duplexing orthogonal frequency division multiplexing (OFDM) communication system, according to an embodiment of the present disclosure.

Referring to FIG. 3A, in a 10 ms radio frame 300 of a frequency division duplexing (FDD) communication system, the PSS is mapped to the last OFDM symbol 302 in slot zero 304 (subframe 0) and slot ten 306 (subframe 5).

Figure 3B:
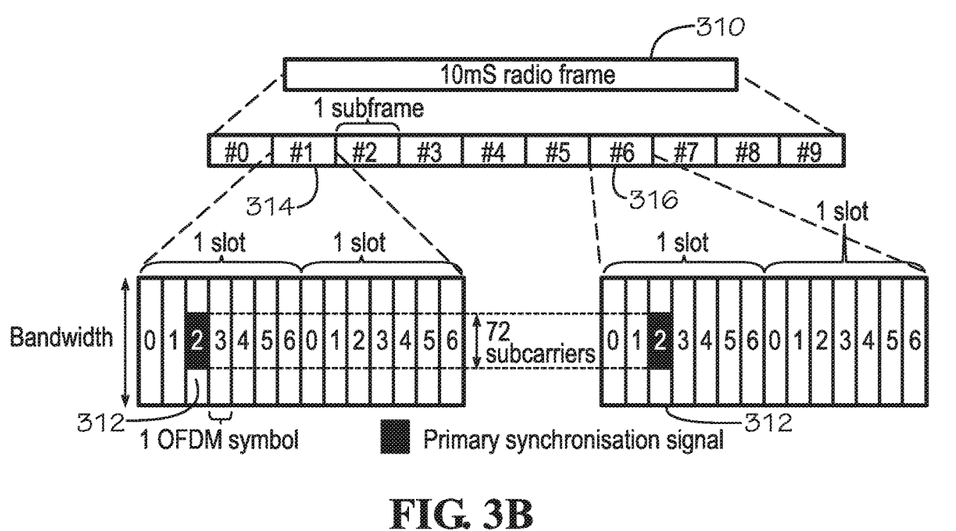
FIG. 3B illustrates a mapping of a primary synchronization signal in a time division duplexing wireless communication system, according to an embodiment of the present disclosure.

FIG. 3B illustrates a mapping of a primary synchronization signal in a time division duplexing orthogonal frequency division multiplexing (OFDM) communication system, according to an embodiment of the present disclosure.

Referring to FIG. 3B, in a 10 ms radio frame 310 of a time division duplexing (TDD) communication system, the PSS is mapped to the third OFDM symbol 312 in subframe 1 314 and subframe 6 316.

The SSS may be based on maximum length sequences (m-sequences). An m-sequence is a pseudorandom binary sequence which may be created by a cycling shift. The m-sequences may be generated using maximal linear feedback shift registers and reproduce every binary sequence that may be represented by the shift registers. Two binary sequences, each of length 31, are used with two binary scrambling codes, each being assigned to the first and second SSS sequence, respectively. The SSS is transmitted in the same subframe as the PSS but in the OFDM symbol that immediately precedes the PSS. The SSS is mapped to the same subcarriers (middle 72 subcarriers) as the PSS.

Figure 4:
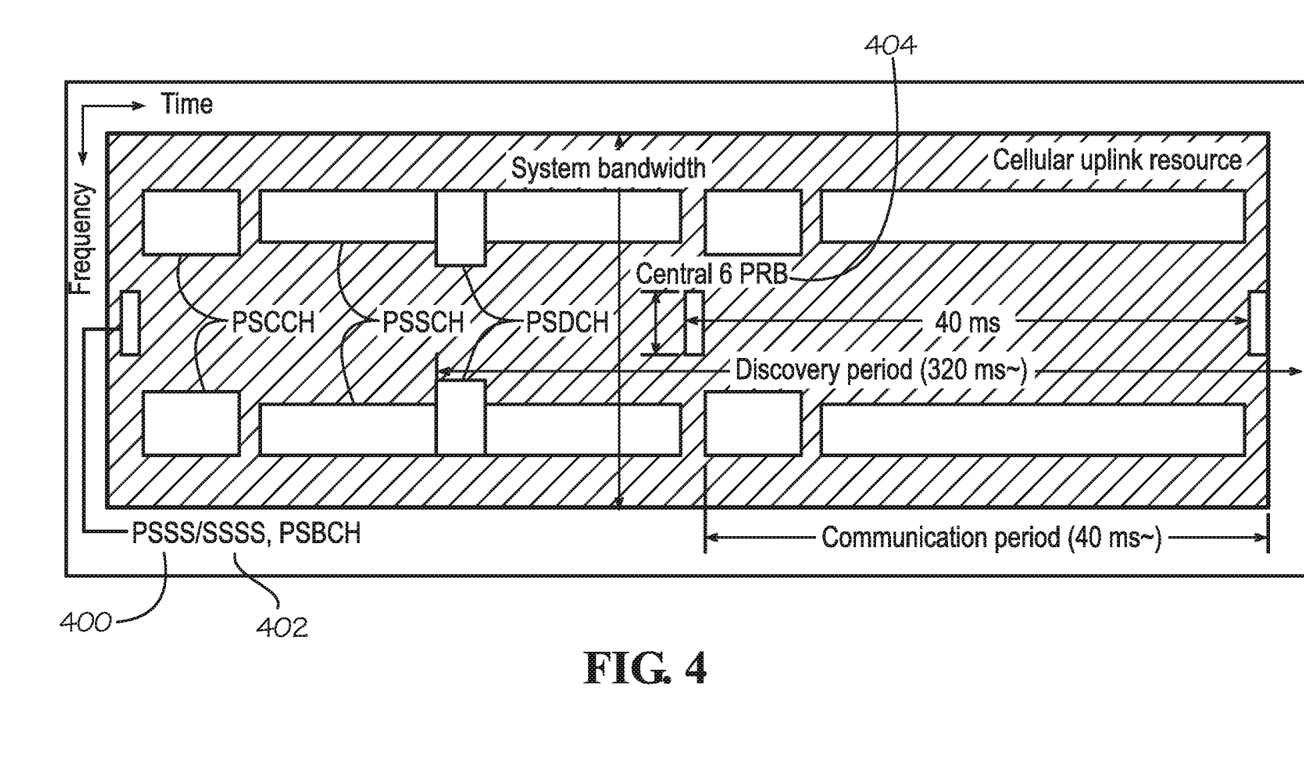
FIG. 4 illustrates resources required for primary and secondary sidelink synchronization signals in a device to device communication network, according to an embodiment of the present disclosure.

FIG. 4 illustrates resources required for primary and secondary sidelink synchronization signals in a device to device (D2D) communication network, according to an embodiment of the present disclosure.

In a device to device (D2D) network, when the electronic device 100 is within a coverage area of an NR transceiver 180, the same signals as PSS/SSS are used to perform synchronization. Referring to FIG. 4, when the electronic device 100 is not within a coverage area of an NR transceiver 180, two signals may be used for synchronization which are defined as the primary sidelink synchronization signal (PSSS) 400 and the secondary sidelink synchronization signal (SSSS) 402. The primary sidelink synchronization signal (PSSS) 400 and the secondary sidelink synchronization signal (SSSS) 402 may not be contiguous to the central 6 RBs 404.

Figure 5:
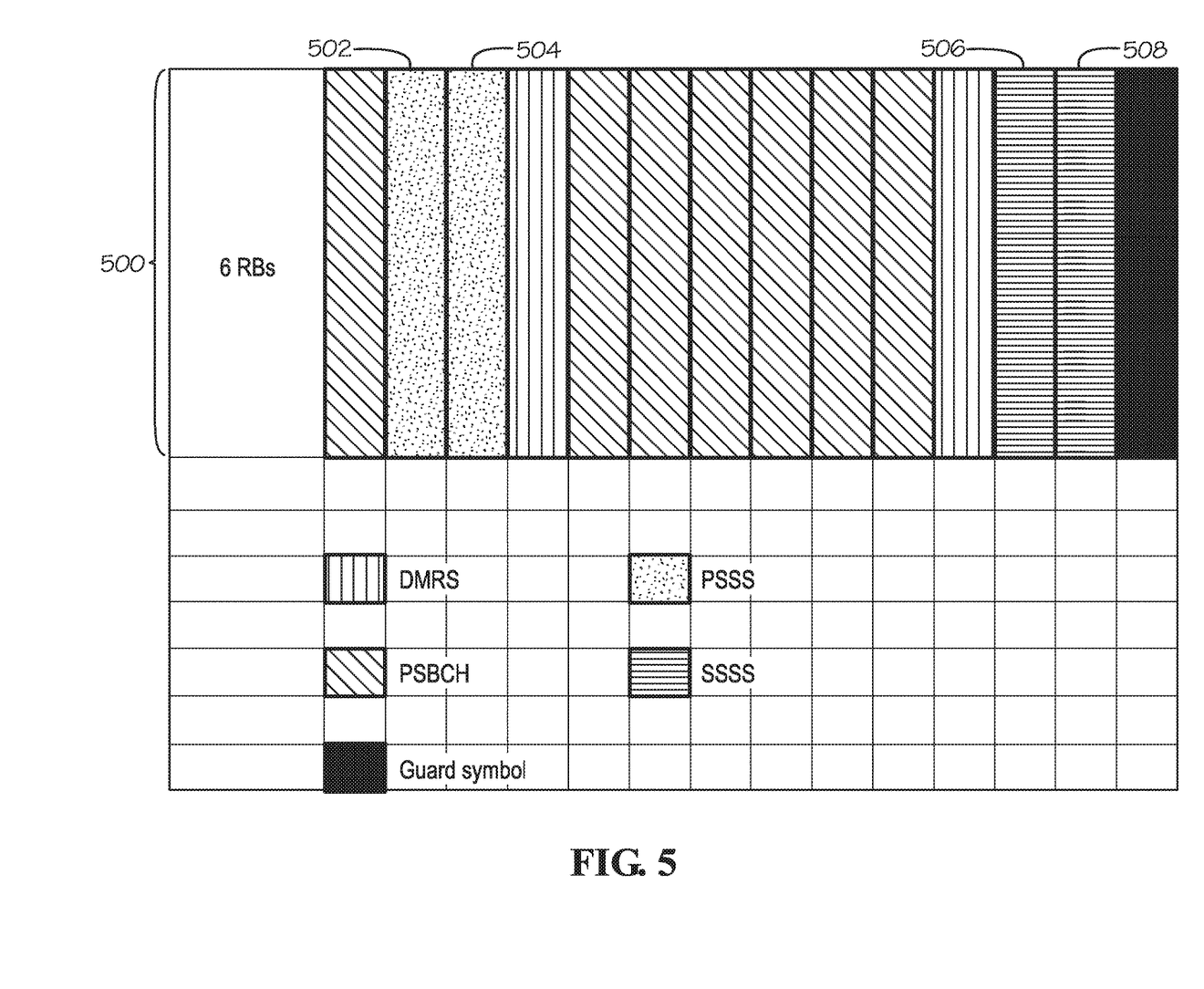
FIG. 5 illustrates a mapping of symbol and slot resources required for primary and secondary sidelink synchronization signals in a device to device communication network, according to an embodiment of the present disclosure.

FIG. 5 illustrates a mapping of symbol and slot resources required for primary and secondary sidelink synchronization signals in a device to device (D2D) communication network, according to an embodiment of the present disclosure.

Referring to FIG. 5, both the PSSS and SSSS signals use frequency domain Zadoff-Chu sequences and m-sequences, which are the same as LTE in the downlink (DL) direction. They are also mapped to the central 6 RBs 500 over 72 subcarriers with a length of 62 symbols. The PSSS is mapped to a first symbol 502 and a second symbol 504, in the first slot for normal cyclic prefix (NCP), and the SSSS 402 is mapped to a fourth symbol 506 and a fifth symbol 508, in the second slot for NCP.

Both the NB-IoT primary synchronization signals (NPSS) and NB-IoT secondary synchronization signals (NSSS) are assigned to a single RB. The NPSS is based on a concatenation of a base sequence combined with a code cover which is 11 symbols long per sequence and 11 sequences are concatenated.

The base sequence of the NSSS may be represented by a short ZC sequence as determined by Equation (3) as follows:

$$Z_k = \exp\left(\frac{-ju\pi k(k+1)}{11}\right), u = 5 \text{ (root ID)} \qquad (3)$$

Where u is a root ID of the ZC sequence and k is the subcarrier index whose value ranges from 0 to 10, or equivalently the ZC sequence index.

The code cover includes a binary sequence and may be represented in Equation (4) as follows:

$$S_{\{1:11\}}=[1\ 1\ 1\ 1\ -1\ -1\ 1\ 1\ 1\ -1\ 1] \qquad (4)$$

Figure 6A:
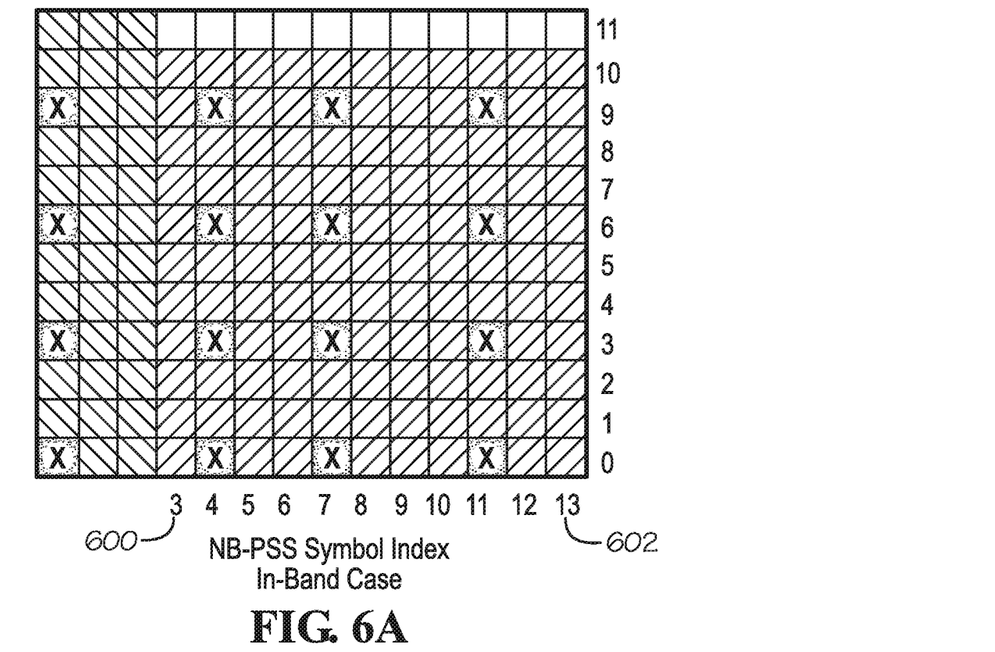
FIG. 6A illustrates a mapping of primary synchronization signals in a narrow band Internet of things communication network, according to an embodiment of the present disclosure.

FIG. 6A illustrates a mapping of primary synchronization signals in a narrow band Internet of things (IoT) communication network, according to an embodiment of the present disclosure.

Figure 6B:
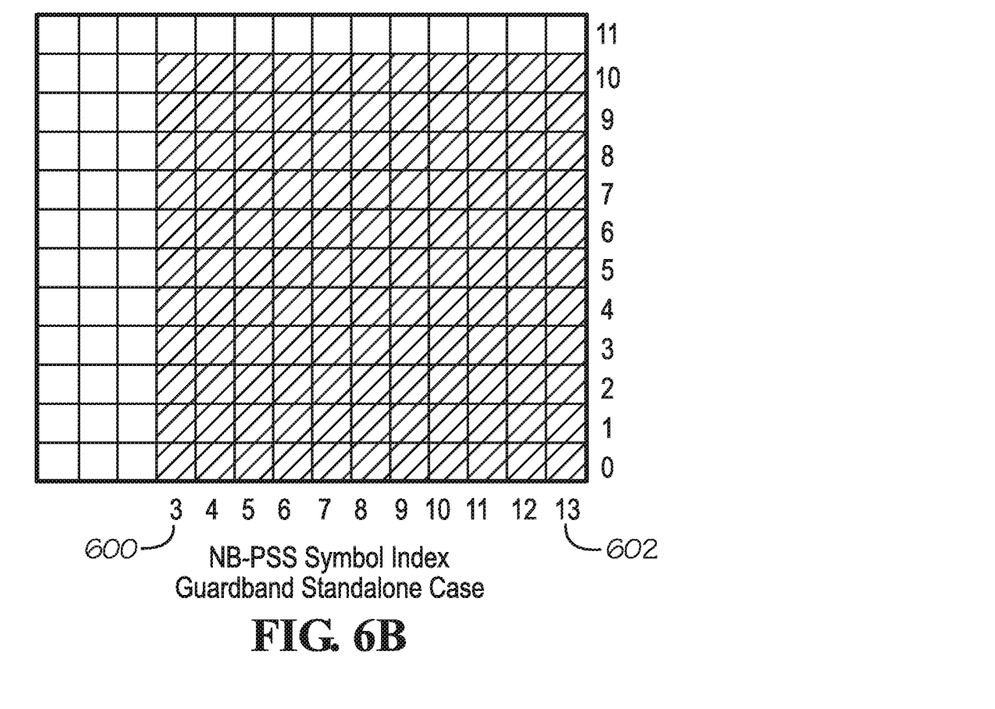
FIG. 6B illustrates a mapping of primary synchronization signals in a narrow band Internet of things communication network, according to another embodiment of the present disclosure.

FIG. 6B illustrates a mapping of primary synchronization signals in a narrow band Internet of things (IoT) communication network, according to another embodiment of the present disclosure.

Referring to FIGS. 6A and 6B, the NPSS sequence begins at the fourth OFDM symbol 600 (which is the number 3 symbol since the numbering begins from 0) and includes subsequent symbols up to and including the thirteenth OFDM symbol 602 in a subframe. The NPSS sequences of FIGS. 6A and 6B are examples and the present disclosure is not limited thereto.

In an embodiment of the present disclosure, the NSSS is composed of a frequency domain ZC sequence with a length of 131 and a binary scrambling sequence. In addition, a time domain cyclic shift is applied to the NSSS sequence. The NSSS may be determined by Equation (5) as follows:

$$NSSS(n) = e^{-\frac{j\pi r_p(n'(n'+1))}{N_{ZC}}} C_{S_p}(n) e^{-\frac{j2\pi l_q n}{d_{max}}} \quad (5)$$

where $n_{ZC}$ is the ZC sequence length, $r_p$ is the ZC root ID, n' is the ZC sequence index, $C_{S_p}$ is the Hadamard sequence defined below, $d_{max}$ is the cyclic shift length which is constant to 132 and also described below.

The ZC sequence used to generate the NSSS may be determined by Equation (6) as follows:

$$e^{-\frac{j\pi r_p(n'(n'+1))}{N_{ZC}}} \quad (6)$$

where $r_p$=mod (CID,126)+3, $N_{ZC}$=131 and n' is the ZC sequence index.

The binary Hadamard sequence used to generate the NSSS may be determined by Equation (7) as follows:

$$C_{S_p}(n) = \text{Hadamard}_{S_p}^{128 \times 128}(\text{mod}(n, 128)) \quad (7)$$

The cyclic shift used to generate the NSSS may be determined by Equation (8) as follows:

$$e^{-\frac{j2\pi l_q n}{d_{max}}} \quad (8)$$

where $d_{max}$=132, $l_0$=0, $l_1$=33, $l_2$=66, $l_3$=99

Figure 7A:
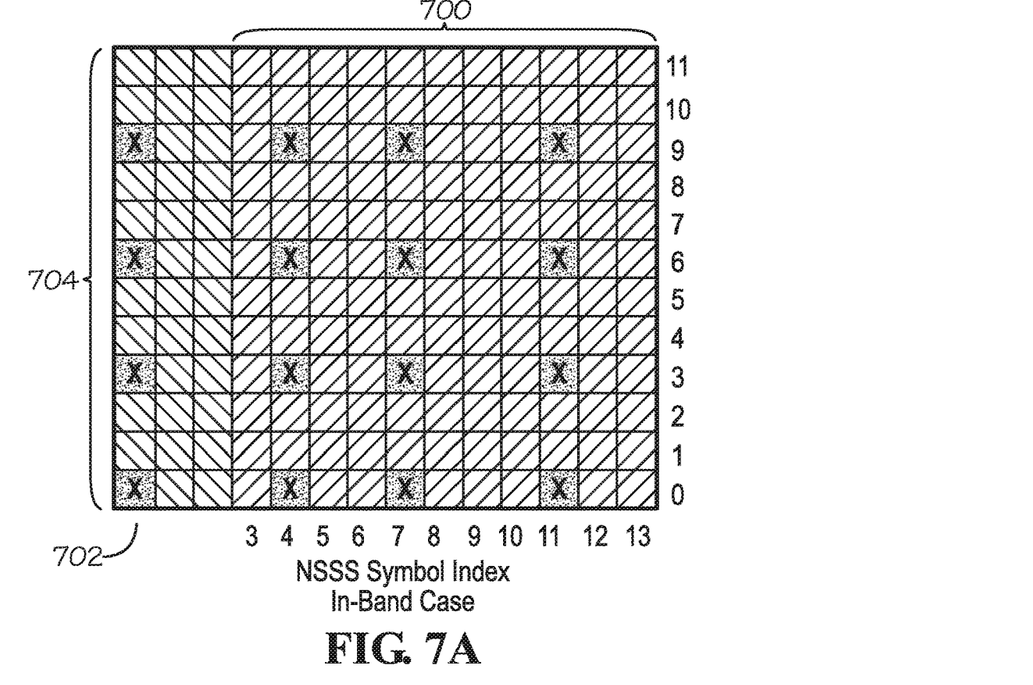
FIG. 7A illustrates a mapping of secondary synchronization signals in a narrow band Internet of things communication network, according to an embodiment of the present disclosure.

FIG. 7A illustrates a mapping of secondary synchronization signals in a narrow band Internet of things (IoT) communication network, according to an embodiment of the present disclosure.

Figure 7B:
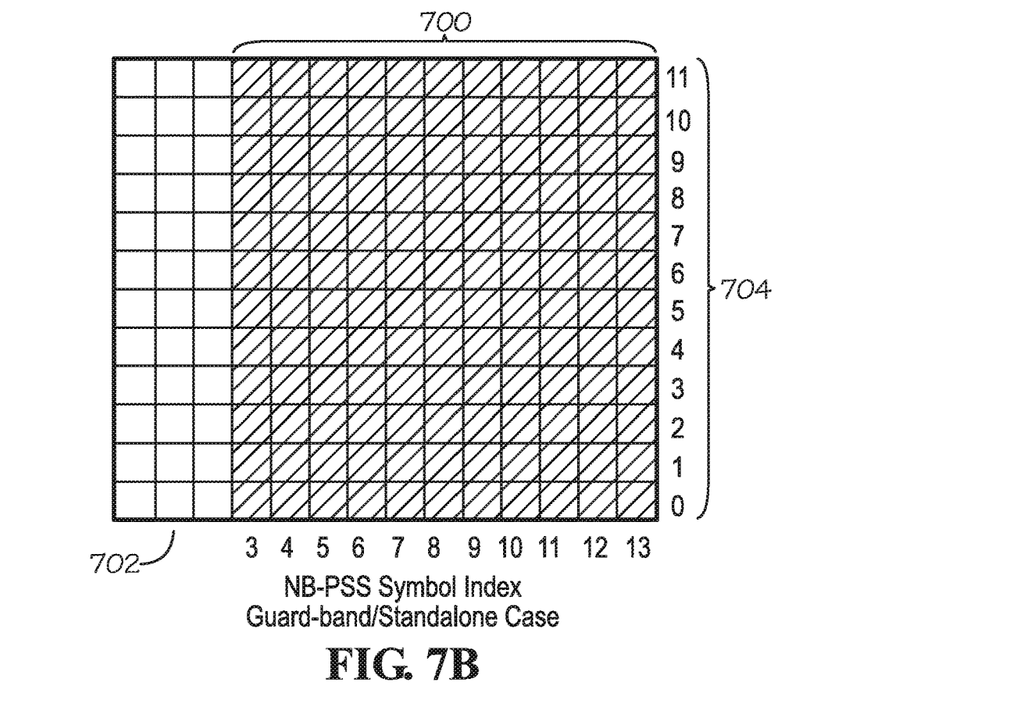
FIG. 7B illustrates a mapping of secondary synchronization signals in a narrow band Internet of things communication network, according to another embodiment of the present disclosure.

FIG. 7B illustrates a mapping of secondary synchronization signals in a narrow band Internet of things (IoT) communication network, according to another embodiment of the present disclosure.

Referring to FIGS. 7A and 7B, the NSSS is mapped to the last 11 OFDM symbols 700 in subframe 702 of every other frame, and is mapped to full 12 subcarriers 704.

In an embodiment of the present disclosure, backwards and forwards compatibility is maintained between existing versions of LTE and future versions of LTE and NR. Interoperability is maintained between different versions of communication standards and between UEs and base stations supporting different feature sets. Embodiments of the present disclosure maximize the amount of time and frequency resources that may be utilized flexibly or that may be left unused without causing backward compatibility issues.

In addition, unused resources may be reserved for future use, the transmission of always-on signals may be minimized, and signals and channels for physical layer functions are confined to configurable and allocable time and frequency resources.

In NR access technology, multiple frequency and time components using different numerologies (numerologies refers to the OFDM configuration in terms of sub-carrier spacing, symbol duration, cyclic prefix, resource block size, etc.) may share a universal synchronization signal. The universal synchronization signal refers to the signal itself and the time and frequency resources used to transmit the universal synchronization signal.

NR access technology enables multiple communication services including mMTC which supports a large number of devices in machine type communications, URLLC applications having high reliability and low latency requirements, direct UE to UE type communications such as device to device (D2D) and vehicle to vehicle (V2V), narrowband services such as IoT, and eMBB for high data throughput applications. NR enables forward and backward compatibility and interoperability for its supported services through flexible configuration of resource allocations and the use of universal synchronization signals.

According to an embodiment of the present disclosure, the universal synchronization signal may be flexibly configured and used among multiple communication services such as eMBB, URLLC, D2D, V2V, mMTC, and IoT. USS enables a common structure of synchronization signals which may be shared among multiple communication services rather than different synchronization signals, such as those under LTE and NB-IoT, which require assigning different synchronization signals with different locations of RBs.

In an embodiment of the present disclosure, the mother code is defined as a short ZC sequence or a constant amplitude zero autocorrelation sequence (CAZAC) combined with single or multiple orthogonal code covers. The mother code may be extended to m RBs and n OFDM symbols with different code covers. The mother code corresponds to a minimum resource unit for NR such as 1 RB in 1 subframe with minimum numerology, such as a bandwidth of 15 kHz. The mother code and/or its extension are shared among multiple services within NR. For example, in eMBB or LTE, the mother code uses in RBs and n OFDM symbols for UPSS with code covers assigned to (m, n) grid patterns. In NB-IoT or IoT, the mother code uses 1 RB and n OFDM symbols shared with eMBB or LTE. In addition, IoT may assign more synchronization signals in the dedicated RB. These synchronization signals would not affect other services since the RB is exclusively assigned to IoT. The m RBs are not necessarily contiguous at the central RBs and a part of m RBs may be used for a specific purpose providing flexibility for multiplexing different numerologies in the same carrier to further enable network operators to accommodate future communication services.

Figure 8:
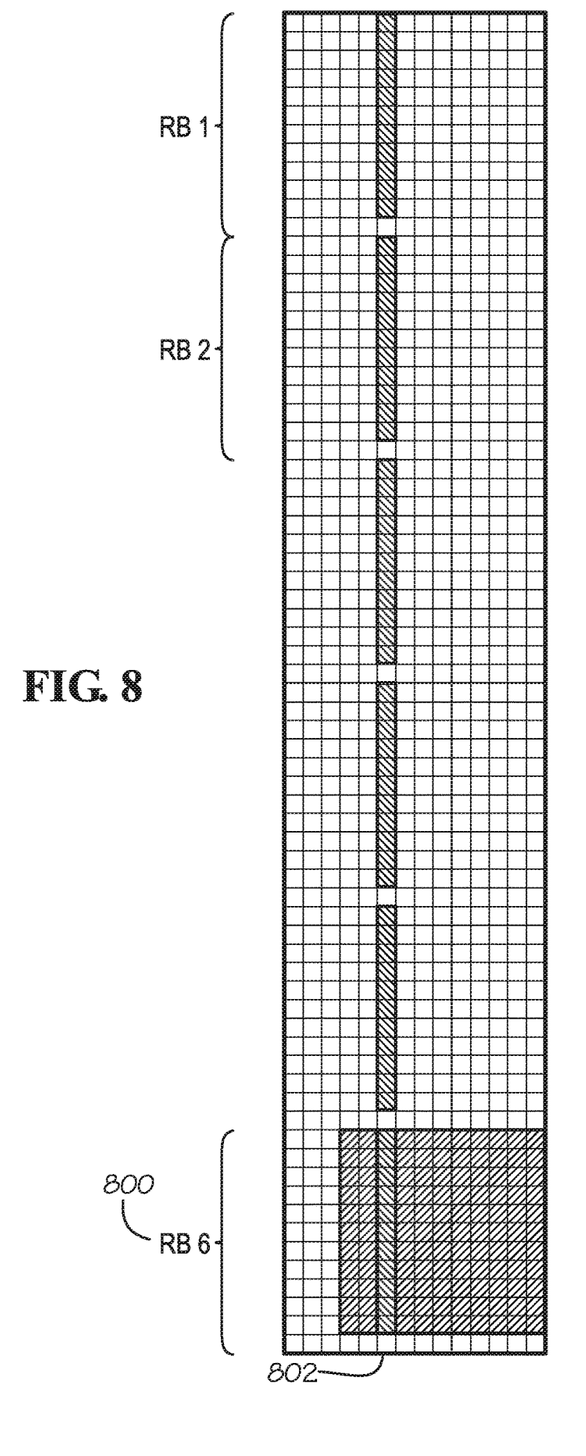
FIG. 8 illustrates a mapping of universal synchronization signals for multiple new radio access technology communication services, according to an embodiment of the present disclosure.

FIG. 8 illustrates a mapping of universal synchronization signals for multiple new radio communication services, according to another embodiment of the present disclosure.

Referring to FIG. 8, a mapping of frequency and time resources for USS is shown in which m=6 and n=1, a short ZC sequence with a length of 11 serves as a base sequence, and a code cover sequence of length m is applied over m RBs. Here, RB 6 800 is assigned to another service, such as IoT, so that other dedicated synchronization symbols are added to the RB, while the number five symbol 802 (the first symbol is the number zero symbol) serves as a shared synchronization signal.

In an embodiment of the present disclosure, the peak to average power ratio (PAPR) is considered since the UPSS could be used for all services within NR access technology. The PAPR depends on the code cover as well as the base sequence. Different code covers may determine different levels of PAPR.

In an embodiment of the present disclosure, the NR transceiver 180 transmits the universal synchronization signals to the transceiver 113 of the electronic device 110. The transceiver 113 includes a receiver which receives and detects the universal synchronization signals. The successful detection of the universal synchronization signals occurs when a number of candidate peaks of cross-correlation are extracted (e.g, 1, 2, 4, 8, 16, 32, and 64) and one of the sampled peaks is within +/−5 sample points of true timing. True timing may be indicated by the index in which the universal synchronization signal sequence begins in the time domain.

The receiver detection of universal synchronization signals in an eMBB or LTE receiver may include a full correlation implementation in which a sequence is spread over m RBs as a single sequence. The correlation may be determined by Equation (9) below:

$$f(t) = |\Sigma_{n=0}^{N-1} r_n(t) c(n)^*| \quad (9)$$

where N is the fast fourier transform (FFT) size, c(n) is a UPSS time domain signal obtained from $mN_{SC}$ subcarriers with N FFT blocks, t is the incoming sample index in the receive buffer, and n is the sample index within a sliding window of size N.

The receiver detection performance of universal synchronization signals in an eMBB or LTE receiver may also include implementation as a double correlation, which exploits the fact that a base sequence is repeated over m RBs. The double correlation may be determined by Equations (10) and (11) below:

$$f_k(t) = \sum_{n=0}^{N/m-1} r_{nm+k}(t) c(nm+k)^* \quad (10)$$

and $$f(t) = \left| \sum_{k=0}^{m-2} f_k(t) f_{k+1}(t)^* \right| \quad (11)$$

where N is the FFT size, c(n) is a UPSS time domain signal obtained from $mN_{SC}$ subcarriers with N FFT blocks, t is the incoming sample index in the receive buffer, n is the sample index within a sliding window of size N, m is the number of RBs, and k is the cross-correlation subsequence index.

The receiver detection of universal synchronization signals in an NB-IoT receiver may include the same procedure as an NB-IoT detection procedure with m=6, and n=1.

In an embodiment of the present disclosure, the USSS provides a structure for synchronization signals that may carry a physical cell identifier (PCID) and frame timing, while providing a universal structure among multiple NR access technologies enabling interoperability across those technologies.

The USSS carries information including PCID and frame timing. A portion of the PCID and frame timing information may also be carried by the UPSS. The total amount of information that USSS (+UPSS) needs to carry is 504 PCIDs×4 (in the case of NB-IoT for frame timing to determine the index where the USSS begins) or 504 PCIDs×2 (in the case of LTE slot index of 2 slots per subframe).

In an embodiment of the present disclosure, the candidate resources which may be required to carry PCID and frame timing may include those listed below for UPSS:

A root ID (RID), which may also be referred to as a root index, which may include a base sequence length of 11 and the twelfth resource element (RE) is identical to the first RE for a circular operation. An RID ranging from 1 to 10 may generate different base sequences;

Cyclic shifts (CS) are not considered in order to reduce implementation complexity; and Only fixed binary scrambling sequences are used.

In an embodiment of the present disclosure, the candidate resources which may be required to carry PCID and frame timing may include those listed below for USSS:

The same root ID used in UPSS is used for USSS in which 10 different base sequences are possible;

Cyclic shifts are supported. When a ZC sequence with a length of 11 is used, each sequence may be cyclic-shifted resulting in 11 different sequences being available;

Binary scrambling sequences are determined based on 2 different cases differing by the sequence in which the scrambling sequences are determined:

Case 1: The eMBB scrambling sequence is determined first, then the NB-IoT scrambling sequence is determined.

For eMBB: Over m RBs and n symbols result in $2^{mn}$ different scrambling sequences being available.

For NB-IoT: n symbols are shared with eMBB. Therefore, over 11−n symbols and $2^{11-n}$ different scrambling sequences are available.

Case 2: The NB-IoT scrambling sequence is determined first, then the eMBB scrambling sequence is determined.

For NB-IoT: Over 11 symbols result in $2^{11}$ different scrambling sequences being available.

For eMBB: 1 RB is shared with NB-IoT. Therefore, over m−1 RBs and n symbols result in $2^{(m-1)n}$ different scrambling sequences being available.

In an embodiment of the present disclosure, the total number of candidate resources required to carry PCID and frame timing is $10 \times 10 \times 11 \times 2^{mn}$ (or $2^{11-n}$) for Case 1 defined above, and $10 \times 10 \times 11 \times 2^{(m-1)n}$ (or $2^{11}$) for Case 2 defined above. In both Case 1 and Case 2, the present system and method minimizes variation in UPSS by choosing a lower number of candidate RIDs for UPSS and minimizes the PAPR by choosing binary scrambling sequences.

The USSS, according to an embodiment of the present disclosure, may have the same structure as the UPSS. The UPSS may include a fixed RID and fixed binary code cover, whereas the USSS may include the following:

10 RIDs, 2 cyclic shifts, and a scrambling sequence over 6 RBs=10×2×64=1280 combinations; or 10 RIDs, 2 cyclic shifts and 100 scrambling sequences=2000 combinations.

If a UE implements the NB-IoT or mMTC communication service, the UE is freely allowed to use any of m RBs and the scrambling sequences located at the shared n symbols may vary according to the RB index of NB-IoT. In this case, the effective amount of USSS information increases by up to 2n times.

Alternatively, if a UE implementing the NB-IoT or mMTC communication service is restricted to search its synchronization signals only at the dedicated RB index, then although the synchronization signals for NB-IoT are assigned at the dedicated RB, the data signals may be transmitted at any RBs and once the synchronization signals are decoded, the hopping information for data signals may be delivered to the UE using a higher layer signaling protocol.

When the PCID and frame timing (or slot index) are determined in the NR transceiver 180, the index of the scrambling sequence, the root ID, and cyclic shifts for the n shared symbols are determined, then the rest of the scrambling sequences are determined for the unshared symbols (or RBs). Since the universal synchronization signals in the NB-IoT communication service may be allocated to any of the RBs, the NR transceiver 180 needs to assign different scrambling sequences to the non-shared symbols.

When the receiver in the transceiver 113 of the electronic device 100 (UE) executes the eMBB or NB-IoT communication service, the receiver needs to search all the possible combinations of resources to detect the PCID and frame timing. However, the receiver does not need to differentiate the shared symbols from the unshared symbols.

In an embodiment of the present disclosure, algorithms corresponding to Equations (10) and (11) of full correlation and double correlation respectively, as described in the UPSS method above, may also be applied to USSS.

In an embodiment of the present disclosure, the receiver detection method used for NPSS may be used with many hypotheses of root ID, cyclic shifts, and scrambling sequences. The cyclic shifts in a frequency domain may correspond to the peak detection in a time domain.

Figure 9:
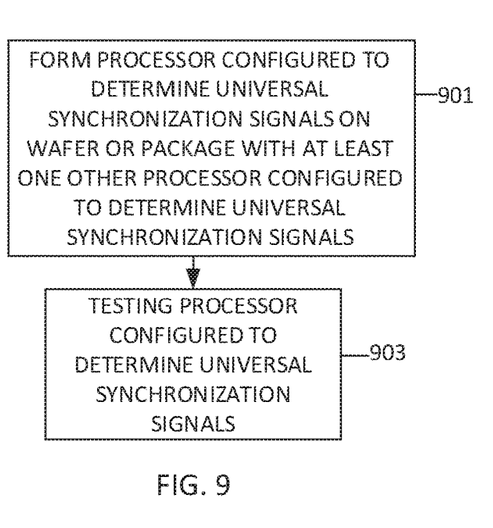
FIG. 9 is a flowchart of a method of testing a processor configured to determine universal synchronization signals, according to an embodiment of the present disclosure.

FIG. 9 is a flowchart of a method of testing a processor configured to determine universal synchronization signals according to an embodiment of the present disclosure, where the processor is either implemented in hardware or implemented in hardware that is programmed with software.

Referring to FIG. 9, the method, at 901, forms the processor as part of a wafer or package that includes at least one other processor. The processor is configured to receive a universal synchronization signal (USS) having a universal primary synchronization signal (UPSS) and a universal secondary synchronization signal (USSS), wherein the USS is coded using a mother code which is extended to m resource blocks (RBs) and n orthogonal frequency division multiplexing (OFDM) symbols and a code cover of m RBs and n symbols is applied to the mother code, determine a cell identity from the USS, determine a frame timing from the USS, and connect a user equipment to a network using the cell identity and the frame timing.

At 903, the method tests the processor. Testing the processor includes testing the processor and the at least one other processor using one or more electrical to optical converters, one or more optical splitters that split an optical signal into two or more optical signals, and one or more optical to electrical converters.

Figure 10:
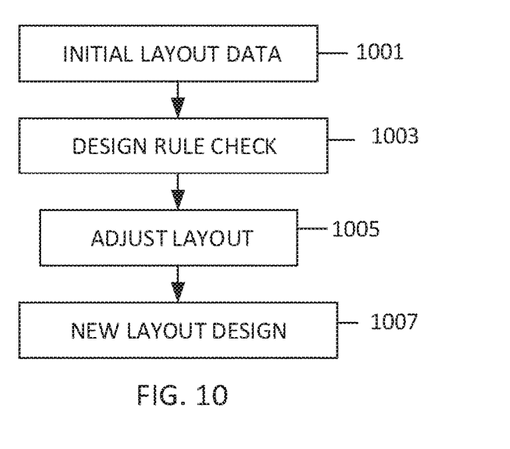
FIG. 10 is a flowchart of a method of manufacturing a processor configured to determine universal synchronization signals, according to an embodiment of the present disclosure.

FIG. 10 is a flowchart of a method of manufacturing a processor configured to determine universal synchronization signals, according to an embodiment of the present disclosure Referring to FIG. 10, the method, at 1001, includes an initial layout of data in which the method generates a mask layout for a set of features for a layer of the integrated circuit. The mask layout includes standard cell library macros for one or more circuit features that include a processor. The processor is configured to receive a universal synchronization signal (USS) having a universal primary synchronization signal (UPSS) and a universal secondary synchronization signal (USSS), wherein the USS is coded using a mother code which is extended to m resource blocks (RBs) and n orthogonal frequency division multiplexing (OFDM) symbols and a code cover of m RBs and n symbols is applied to the mother code, determine a cell identity from the USS, determine a frame timing from the USS, and connect a user equipment to a network using the cell identity and the frame timing.

At 1003, there is a design rule check in which the method disregards relative positions of the macros for compliance to layout design rules during the generation of the mask layout.

At 1005, there is an adjustment of the layout in which the method checks the relative positions of the macros for compliance to layout design rules after generating the mask layout.

At 1007, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

Figure 11:
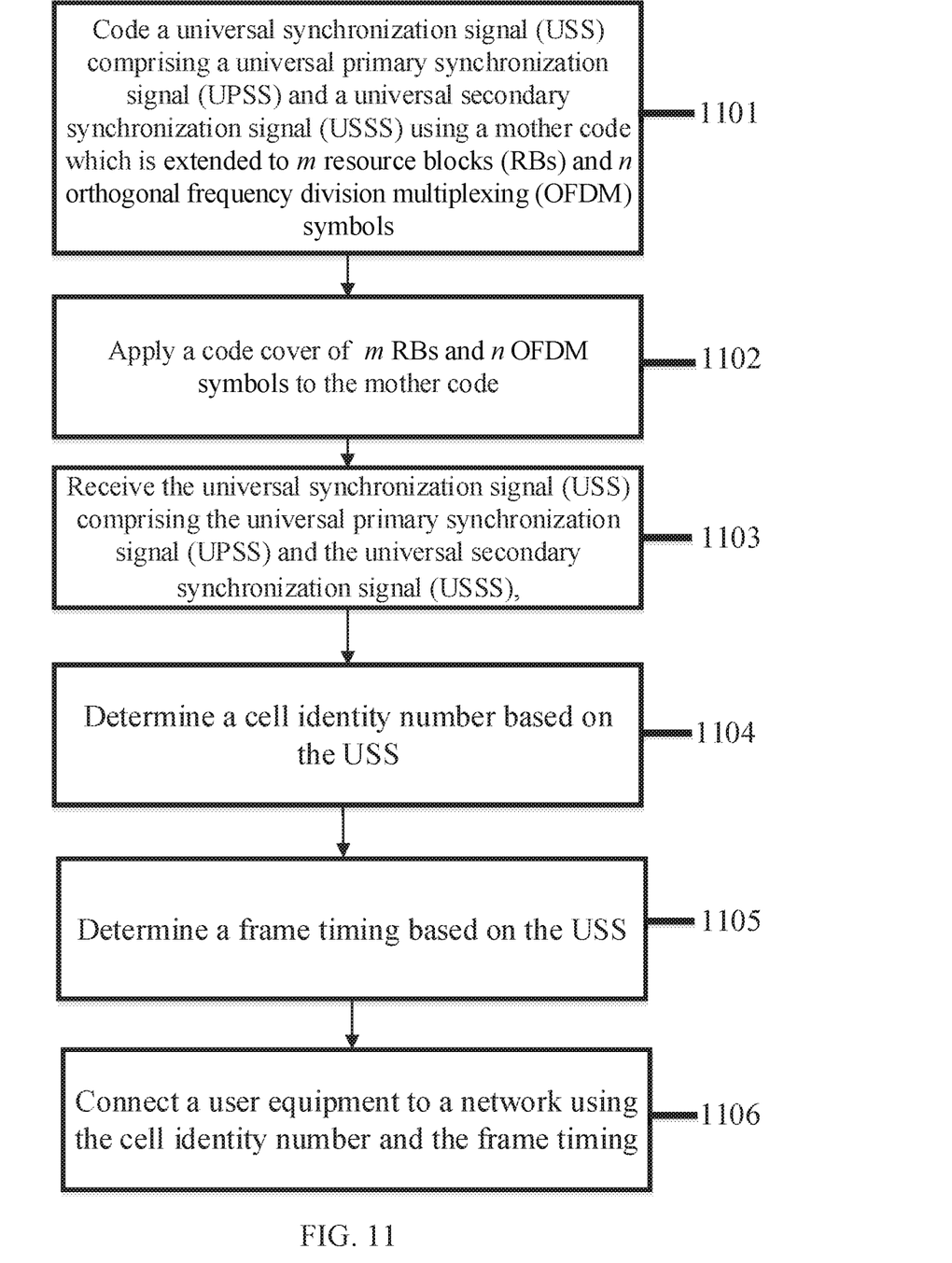
FIG. 11 is a flowchart of a method of connecting a user equipment to a network using a universal synchronization signal (USS), according to an embodiment of the present disclosure.

FIG. 11 is a flowchart of a method of connecting a user equipment to a network using a universal synchronization signal (USS), according to an embodiment of the present disclosure.

Referring to FIG. 11, the method, at 1101, includes coding a universal synchronization signal (USS) having a universal primary synchronization signal (UPSS) and a universal secondary synchronization signal (USSS) using a mother code which is extended to m resource blocks (RBs) and n orthogonal frequency division multiplexing (OFDM) symbols. At 1102, the method applies a code cover of m RBs and n OFDM symbols to the mother code. At 1103, the method receives the universal synchronization signal (USS) having the universal primary synchronization signal (UPSS) and the universal secondary synchronization signal (USSS). At 1104, the method determines a cell identity number based on the USS. At 1105, the method determines a frame timing based on the USS. At 1106, the method connects a user equipment to a network using the cell identity number and the frame timing.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method, comprising:
receiving a universal synchronization signal (USS) that supports multiple cover codes of multiple communication services, the USS comprising a universal primary synchronization signal (UPSS) and a universal secondary synchronization signal (USSS), wherein the USS is coded using a mother code having m resource blocks (RBs) and n orthogonal frequency division multiplexing (OFDM) symbols, the mother code having a common structure allowing an electronic device to receive a first synchronization signal of a first communication service having a first number of RBs and a first number of OFDM symbols and a second synchronization signal of a second communication service having a second number of RBs and a second number of OFDM symbols, wherein a total number of RBs and OFDM symbols of the first and second synchronization signals are within the m number of RBs and the n number of OFDM symbols of the mother code such that the mother code allows the electronic device to receive the first synchronization signal of the first communication service and the second synchronization signal of the second communication service simultaneously;

determining a cell identity number based on the USS;

determining a frame timing based on the USS; and connecting a user equipment to a network using the cell identity number and the frame timing.

2. The method of claim 1, wherein the mother code is a constant amplitude zero autocorrelation sequence.

3. The method of claim 1, wherein the cell identity number is calculated by $$N_{ID}^{CELL}=3N_{ID}^{(1)}+N_{ID}^{(2)}$$

wherein $N_{ID}^{(1)}$ is a physical cell identity group which is detected by the USSS and $N_{ID}^{(2)}$ is a cell identity within the physical cell identity group which is detected by the UPSS.

4. The method of claim 1, wherein at least a part of the mother code is shared among a plurality of new radio (NR) access technologies.

5. The method of claim 1, wherein the USS uses non-contiguous resource blocks (RBs) and non-contiguous symbols.

6. The method of claim 1, wherein the UPSS comprises a Zadoff-Chu (ZC) sequence with a fixed root index.

7. The method of claim 1, wherein the UPSS comprises a Zadoff-Chu (ZC) sequence with a root index value from 1 to a length of the Zadoff-Chu (ZC) sequence −1.

8. The method of claim 1, wherein the USSS comprises a Zadoff-Chu (ZC) sequence with multiple root indexes and a cyclic shift.

9. The method of claim 1, wherein the network is at least one of enhanced mobile broad band (eMBB), massive machine type communication (mMTC), ultra reliable low latency communication (URLLC), and narrow-band Internet of things (NB-IoT).

10. An apparatus, comprising:

a receiver configured to:

receive a universal synchronization signal (USS) that supports multiple cover codes of multiple communication services, the USS comprising a universal primary synchronization signal (UPSS) and a universal secondary synchronization signal (USSS), wherein the USS is coded using a mother code having m resource blocks (RBs) and n orthogonal frequency division multiplexing (OFDM) symbols, the extended mother code having a common structure allowing an electronic device to receive a first synchronization signal of a first communication service having a first number of RBs and a first number of OFDM symbols and a second synchronization signal of a second communication service having a second number of RBs and a second number of OFDM symbols, wherein a total number of RBs and OFDM symbols of the first and second synchronization signals are within the m number of RBs and the n number of OFDM symbols of the mother code such that the mother code allows the electronic device to receive the first synchronization signal of the first communication service and the second synchronization signal of the second communication service simultaneously; and a processor configured to:

determine a cell identity from the USS;

determine a frame timing from the USS; and connect a user equipment to a network using the cell identity and the frame timing.

11. The apparatus of claim 10, wherein the mother code is a constant amplitude zero autocorrelation sequence.

12. The apparatus of claim 10, wherein the cell identity number is calculated by $$N_{ID}^{CELL}=3N_{ID}^{(1)}+N_{ID}^{(2)}$$

wherein $N_{ID}^{(1)}$ is a physical cell identity group which is detected by the USSS and $N_{ID}^{(2)}$ is a cell identity within the physical cell identity group which is detected by the UPSS.

13. The apparatus of claim 10, wherein at least a part of the mother code is shared among a plurality of new radio (NR) access technologies.

14. The apparatus of claim 10, wherein the USS uses non-contiguous resource blocks (RBs) and non-contiguous symbols.

15. The apparatus of claim 10, wherein the UPSS comprises a Zadoff-Chu (ZC) sequence with a fixed root index.

16. The apparatus of claim 10, wherein the UPSS comprises a Zadoff-Chu (ZC) sequence with a root index value from 1 to a length of the Zadoff-Chu (ZC) sequence −1.

17. The apparatus of claim 10, wherein the USSS comprises a Zadoff-Chu (ZC) sequence with multiple root indexes and a cyclic shift.

18. The apparatus of claim 10, wherein the network is at least one of enhanced mobile broad band (eMBB), massive machine type communication (mMTC), ultra reliable low latency communication (URLLC), and narrow-band Internet of things (NB-IoT).

* * * * *